(12) United States Patent
Muhammad

(10) Patent No.: US 8,391,806 B2
(45) Date of Patent: Mar. 5, 2013

(54) WIRELESS COMMUNICATIONS DEVICE WITH AN ADJUSTABLE IMPEDANCE MATCHING NETWORK AND ASSOCIATED METHODS

(75) Inventor: Khurram Muhammad, Irving, TX (US)

(73) Assignee: Research In Motion Limited, Waterloo, Ontario (CA)

( * ) Notice: Subject to any disclaimer, the term of this patent is extended or adjusted under 35 U.S.C. 154(b) by 255 days.

(21) Appl. No.: 12/984,170

(22) Filed: Jan. 4, 2011

(65) Prior Publication Data

US 2012/0171970 A1 Jul. 5, 2012

(51) Int. Cl.
*H04B 1/02* (2006.01)
*H04K 3/00* (2006.01)
(52) U.S. Cl. ......................................... 455/107; 343/850
(58) Field of Classification Search .................. 455/107, 455/126; 333/24 R, 109; 343/850, 860
See application file for complete search history.

(56) References Cited

U.S. PATENT DOCUMENTS

| | | | |
|---|---|---|---|
| 3,825,825 A | 7/1974 | Smolka | 324/57 R |
| 5,913,154 A | 6/1999 | Wynn | 455/127 |
| 6,297,780 B1 | 10/2001 | Kirisawa | 343/703 |
| 6,349,216 B1 * | 2/2002 | Alberth et al. | 455/550.1 |
| 6,845,126 B2 | 1/2005 | Dent et al. | 375/219 |
| 7,239,849 B2 | 7/2007 | Bereza et al. | 455/67.14 |
| 7,373,114 B2 | 5/2008 | Yagyu et al. | 455/78 |
| 7,423,605 B2 | 9/2008 | Qi et al. | 343/818 |
| 2004/0012443 A1 * | 1/2004 | Ikonen et al. | 330/136 |
| 2008/0090539 A1 | 4/2008 | Thompson | 455/250.1 |
| 2008/0106349 A1 | 5/2008 | McKinzie | 333/17.3 |
| 2008/0158090 A1 | 7/2008 | Dupont et al. | 343/850 |

FOREIGN PATENT DOCUMENTS

| | | |
|---|---|---|
| EP | 0210746 | 6/1986 |
| WO | 2004/098076 | 11/2004 |

OTHER PUBLICATIONS

Debaillie et al. "*Calibration of Direct-Conversion Transceivers*" IEEE Journal of Selected Topics in Signal Processing, vol. 3. No. 3, Jun. 2009.
TPM Series, Transmitter Power Monitors: Bird Technologies Group. com/product/item-12d3d788-e5e4-4d1d-bd30-eb103f80044b; printed Sep. 20, 2010.
Custer, Kevin "*Directional & Non (Bi) Directional Test Points*" www. catvtech.com/nondirectional.html; printed Oct. 25, 2010.

* cited by examiner

*Primary Examiner* — Lee Nguyen
(74) *Attorney, Agent, or Firm* — Allen, Dyer, Doppelt, Milbrath & Gilchrist, P.A.

(57) ABSTRACT

A mobile wireless communications device includes a portable housing, a transmitter carried by the portable housing and configured to modulate an input signal, and an adjustable impedance matching network coupled downstream from the transmitter. An antenna is coupled downstream from the adjustable impedance matching network, and a non-directional coupler is coupled between the adjustable impedance matching network and the antenna. A feedback receiver is coupled to the non-directional coupler to generate a feedback signal. A controller is configured to control the adjustable impedance matching network based upon the input signal and the feedback signal.

28 Claims, 6 Drawing Sheets

WIRELESS COMMUNICATIONS DEVICE WITH AN ADJUSTABLE IMPEDANCE MATCHING NETWORK AND ASSOCIATED METHODS

TECHNICAL FIELD

The present disclosure relates to the field of wireless communications, and more particularly, to antenna impedance matching in wireless communications devices.

BACKGROUND

Power amplifiers (PA) in wireless communications devices are typically designed to drive antennas at a higher power than necessary. An impedance mismatch between the antenna and the power amplifier causes standing waves at the output of the power amplifier. This reduces the total radiated power of a wireless communications device.

Load impedance variations at the antenna of the wireless communications device are caused by reflections of the radiated electromagnetic (EM) waves from objects in the vicinity of the antenna. The resulting standing waves at the output of the power amplifier can damage and reduce the total radiated power of the wireless communications device. The reflected power is expressed as a voltage standing wave ratio (VSWR), which is a ratio of the maximum to minimum amplitude (voltage or current) of the corresponding field components on the line that feeds the antenna.

To provide enough total radiated power, the power amplifier is typically over-designed to be able to provide sufficient output power to the antenna such that the total radiated power specification can be met even under poor impedance matching conditions. As a result, the power amplifier is designed to produce more output power than what it would need if the impedance match was to be perfect. This causes the efficiency of the power amplifier to be lowered at the nominal output power at the antenna as compared to another power amplifier that was designed to operate under perfect impedance matching conditions with the antenna.

One approach to address this problem is to use a programmable impedance matching network to adjust the impedance presented by the antenna. Impedance matching elements such as Barium Strontium Titanate (BST) capacitors or microelectromechanical (MEM) capacitors may be used to provide a programmable capacitance under an applied control voltage. The applied control voltage may typically be within a range of 0-30V, for example. The DC point sets the capacitance value which can be used to create the programmable impedance matching network. The complete matching network is formed by making a pi to T network with two programmable capacitors and an inductor, or one programmable capacitor and two inductors.

Directional couplers are typically used with programmable impedance matching networks, and are placed on the path between the power amplifier and the antenna to measure forward and reflected power. Detection of the forward and reflected power is performed using log-amplifiers and non-linear detectors associated with the directional couplers. The impedance matching elements can then be adjusted to increase the forward power or reduce the reflected power. A disadvantage of directional couplers is that they are limited in dynamic range and directivity over a wide frequency band of operation. To support a wide frequency band of operation, multiple directional couplers are required. However, this increases the cost and complexity of a wireless communications device.

DETAILED DESCRIPTION

Figure 1:
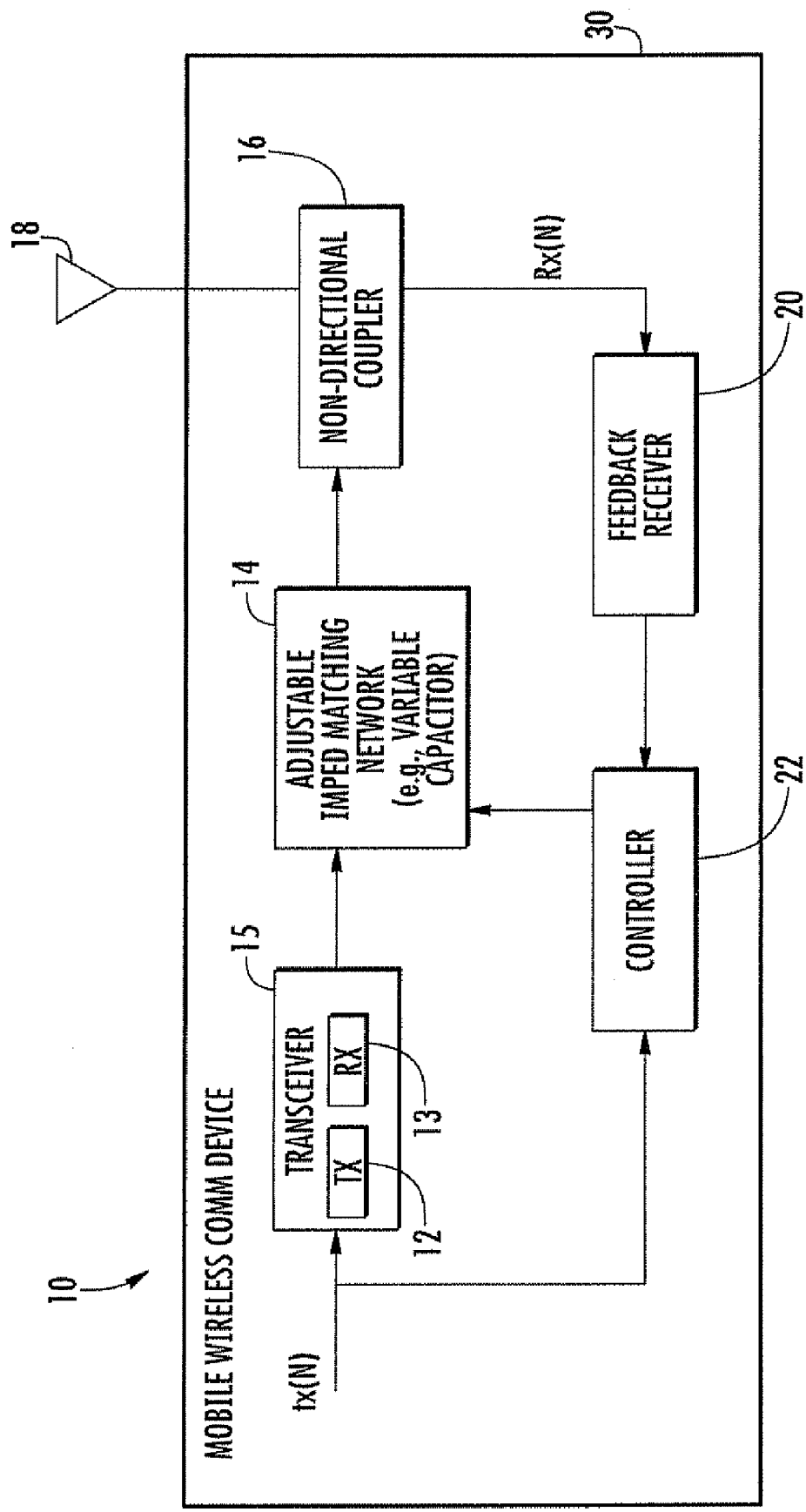
FIG. 1 is a schematic block diagram of a mobile wireless communications device in accordance with one exemplary aspect.

The present description is made with reference to the accompanying drawings, in which various embodiments are shown. However, many different embodiments may be used, and thus the description should not be construed as limited to the embodiments set forth herein. Rather, these embodiments are provided so that this disclosure will be thorough and complete. Like numbers refer to like elements throughout and prime notation is used to indicate similar elements in alternative embodiments.

In accordance with one exemplary aspect, a mobile wireless communications device comprises a portable housing, a transmitter carried by the portable housing and configured to modulate an input signal, and an adjustable impedance matching network carried by the portable housing and coupled downstream from the transmitter. An antenna may be carried by the portable housing and may be coupled downstream from the adjustable impedance matching network. A non-directional coupler may be carried by the portable housing and may be coupled between the adjustable impedance matching network and the antenna. A feedback receiver may be carried by the portable housing and may be coupled to the non-directional coupler to generate a feedback signal. A controller may be carried by the portable housing and may be configured to control the adjustable impedance matching network based upon the input signal and the feedback signal.

An advantage of the mobile wireless communications device is that the antenna impedance matching does not require the use of directional couplers. Instead, a non-directional coupler is used. A non-directional coupler operates over a wide frequency band of operation. This is particularly advantageous when the transmitter is a multi-frequency band transmitter. The non-directional coupler may comprise a signal path conductor and a feedback path conductor inductively coupled thereto. Alternatively, the non-directional coupler may comprise a signal path conductor and a resistive load coupled thereto. A high resistance couples an insignificantly small fraction of the transmitted power to the feedback path.

The controller may be configured to compare the input signal to the transmitter to the feedback signal in at least one iteration to determine at least one difference therebetween, and adjust an impedance of the adjustable impedance matching based upon the at least one difference. The at least one iteration may comprise a plurality of iterations, and the controller may be further configured to add a correction value to the input signal in each iteration. The controller may be configured to calculate correction values based on a least means square (LMS) algorithm.

The feedback path may comprise a low noise amplifier (LNA) followed by a mixer driven by a phase locked loop (PLL) independent of the PLL driving the mixer in the transmitter. Analog baseband and digital baseband blocks follow an IQ mixer output and furnish the feedback signal in the digital format to the controller. Having an independent PLL for the feedback receiver allows the feedback transmit signal to be placed at an IF frequency and separate the impairments added by the feedback receiver in the frequency domain. A second down-conversion in the receiver digital block can down-convert the feedback transmit signal to a zero-IF while translating the impairments due to the receiver (e.g., offsets) at the IF frequency. A low-pass filter can then isolate the feedback transmit signal and furnish it to the controller, thereby removing all impairments introduced by the feedback receiver.

The controller may comprise a delay circuit configured to delay the input signal so that the input signal and the feedback signal match up in time when compared. The delay circuit may be configured to implement a fixed delay corresponding to inherent delays of the transmitter and the feedback receiver, and a variable delay corresponding to variable environmental conditions.

The adjustable impedance matching network may comprise at least one variable capacitor. The wireless communications device may further comprise a signal receiver carried by the portable housing and coupled to the antenna. The transmitter may comprise a multi-frequency band transmitter.

A method aspect is for operating a mobile wireless communications device as described above. The method comprises generating an input signal to be modulated by the transmitter, and operating the feedback receiver to generate a feedback signal from the non-directional coupler. The adjustable impedance matching network may then be adjusted based upon the input signal and the feedback signal.

Referring initially to FIG. 1, a mobile wireless communications device 10 comprises a transmitter 12, an adjustable impedance matching network 14, a non-directional coupler 16, an antenna 18, a feedback receiver 20 and a controller 22. All of these items are carried by a portable housing 30. The mobile wireless communications device 10 may be a cellular telephone, for example.

When the mobile wireless communications device 10 is configured to operate in a full-duplex mode, the transmitter 12 is included as part of a transceiver 15. The receiver 13 associated with the transceiver 15 is a signal receiver for receiving externally transmitted signals. In this configuration, the feedback receiver 20 is an additional receiver that is included within the mobile wireless communications device 10 to service the needs of the transmitter 12, for example. Calibration and compensation are two examples of servicing the needs of the transmitter 12 as will be appreciated by those skilled in the art. A feedback receiver with an independent PLL can alleviate calibration and compensation needs in the receiver by offsetting the local oscillator (LO) for the receiver from the LO used in the transmitter, thereby separating the transmit feedback signal in frequency domain from the impairments added in the receiver.

When the mobile wireless communications device 10 is configured to operate in a half-duplex mode, there is a single receiver. In this configuration, the single receiver operates as the feedback receiver and the signal receiver. In this case calibration and compensation are two examples of servicing the needs of the receiver as will be appreciated by those skilled in the art.

Regardless of the mode of operation, i.e., full-duplex or half-duplex, the transmitter 12 is configured to modulate and transmit an input signal tx(n). The adjustable impedance matching network 14 is coupled downstream from the transmitter 12, and the antenna 18 is coupled downstream from the adjustable impedance matching network. The non-directional coupler 16 is coupled between the adjustable impedance matching network 14 and the antenna 18. The feedback receiver 20 is coupled to the non-directional coupler 16 to generate a feedback signal rx(n). The controller 22 is configured to control the adjustable impedance matching network 14 based upon the input signal tx(n) and the feedback signal rx(n).

An advantage of using a non-directional coupler 16 is that it can operate over a wide band of operation, and its performance remains well controlled over temperature and frequency changes. This is not the case with directional couplers. For illustration purposes, the transmitter 12 may be a multi-frequency band transmitter that operates over a 2.4 GHz frequency band (i.e., approximately 2.4 to 2.483 GHz) and over a 5 GHz frequency band (i.e., approximately 4.9 to 6 GHz). Depending on the intended application, the transmitter 12 may operate over other frequency bands, as readily appreciated by those skilled in the art.

Using the above example, the same non-directional coupler 16 can operate over both the 2.4 GHz frequency band and the 5 GHz frequency band. In sharp contrast, two directional couplers would be needed in place of a single non-directional coupler 16, one for the 2.4 GHz frequency band and one for the 5 GHz frequency band. Consequently, the use of directional couplers increases the complexity and adds to the cost of such devices.

Figure 2:
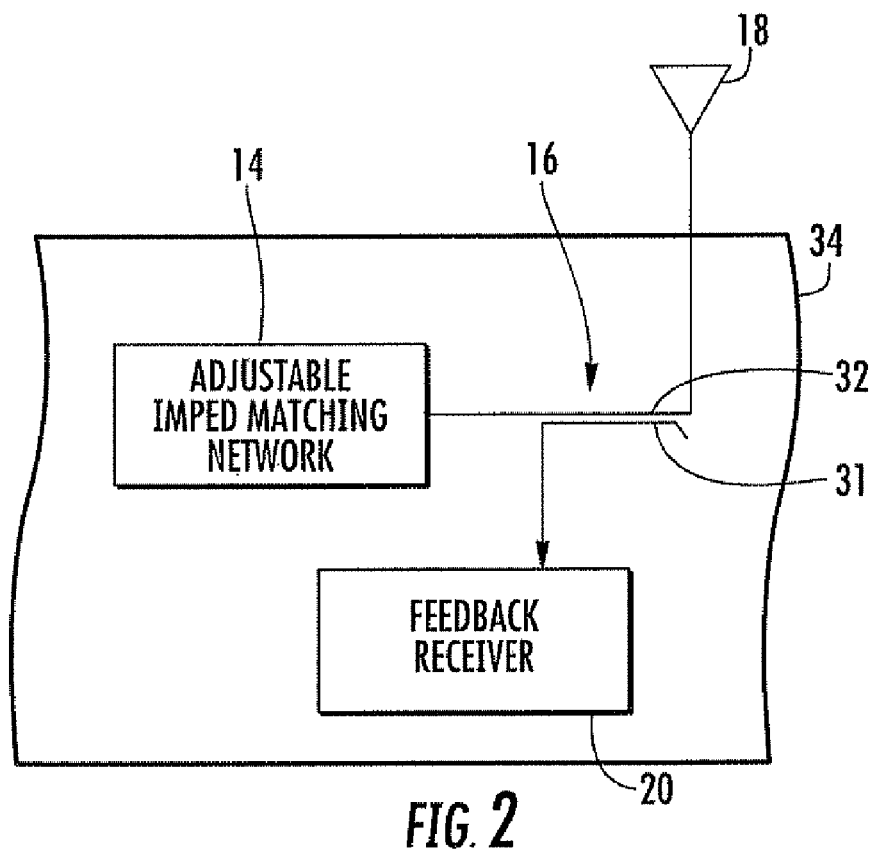
FIG. 2 is a schematic block diagram of the non-directional coupler illustrated in FIG. 1.

The non-directional coupler 16 directs a small amount of signal energy from the antenna 18 to the feedback receiver 20. In one embodiment, the non-directional coupler 16 is configured as a wire trace 31 that is parasitically (e.g., inductively, electromagnetically) coupled to another wire trace 32 functioning as a signal path between the adjustable impedance matching network 14 and the antenna 18, as illustrated in FIG. 2. Both of these wire traces 31, 32 may be formed on a printed circuit board (PCB) 34.

Figure 3:
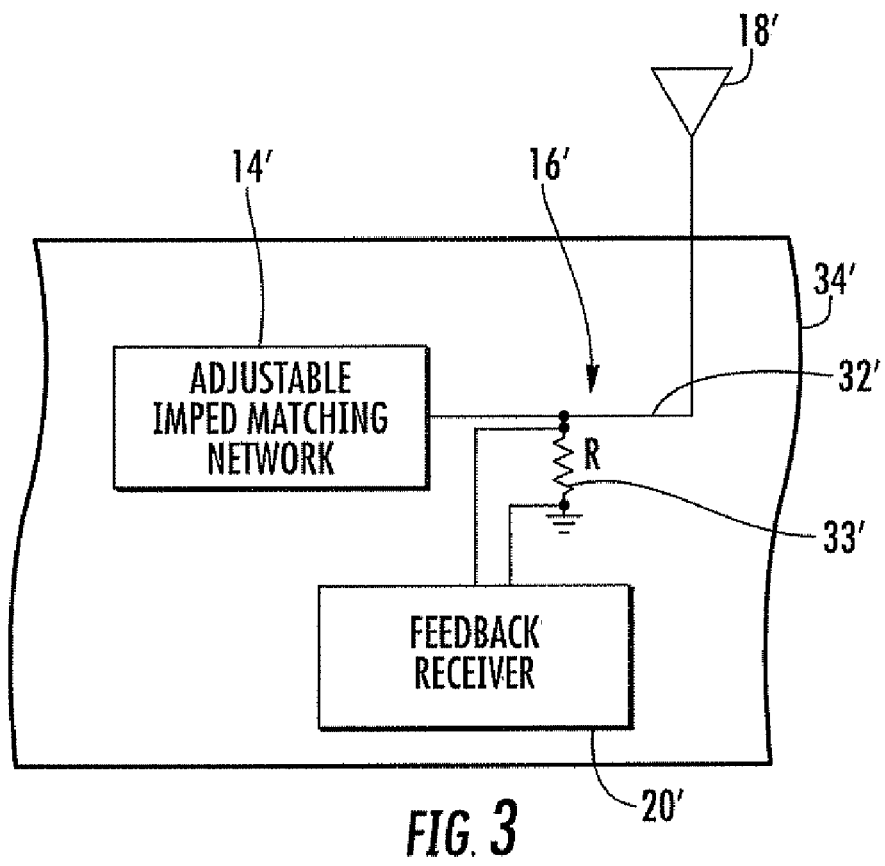
FIG. 3 is a schematic block diagram of another embodiment of the non-directional coupler illustrated in FIG. 1.

In another embodiment, the non-directional coupler 16' is a resistive load 33' coupled to the signal path 32', as illustrated in FIG. 3. The resistive load 33' may have a value within a range of about 5K to 10K ohms, for example. The resistive load 33' and the signal path 32' may also be formed on a PCB 34'.

Figure 4:
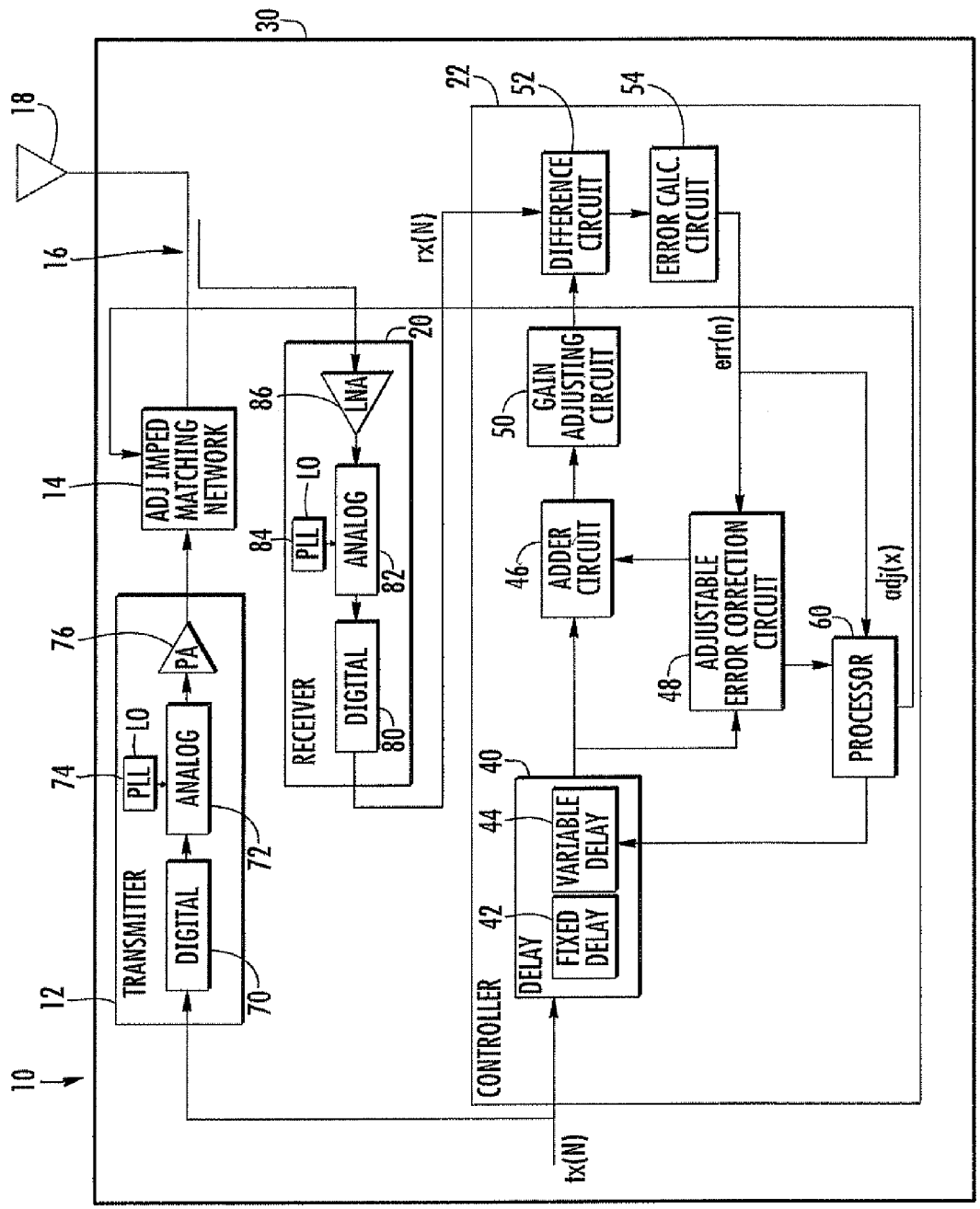
FIG. 4 is a more detailed schematic block diagram of the mobile wireless communications device illustrated in FIG. 1.

Referring now to FIG. 4, the mobile wireless communications device 10 will be discussed in greater detail. Starting with the controller 22, a copy of the distorted signal at the antenna 18 is compared with a delayed version of the same signal tx(n) prior to transmission and without distortion. The differences between the two versions of the same signal are then used to estimate the impedance mismatch at the antenna 18.

The controller 22 thus receives two signals: the signal to be transmitted tx(n) without distortion (i.e., the input signal) and a copy of the transmitted signal with distortion (i.e., the feedback signal rx(n)). A delay circuit 40 is used to delay the input signal tx(n). The delay is necessary for the feedback signal rx(n) to be aligned with the input signal tx(n) when compared.

The illustrated delay circuit 40 includes a fixed delay circuit portion 42 and a variable delay circuit portion 44. The fixed delay circuit portion 42 accounts for the inherent delays of the transmitter 12 and the feedback receiver 20. The variable delay circuit portion 44 accounts for environmental conditions, such as operating temperature variations, for example. In particular, the analog transmit section 72 within the transmitter 12 and the analog receive section 82 within the feedback receiver 20 are effected by temperature variations. The variable delay circuit portion 44 may be under the control of a processor 60, which includes a temperature sensor, for example. Alternatively, the temperature sensor may be separate from the processor 60. The delay can also change with the change of filter corner frequency of filters in the baseband part of the transmitter as well as the receiver to support multistandard radio configurations or AGC settings within a single standard.

The delayed input signal is applied to an adder circuit 46 and to an adjustable error correction circuit 48. The adjustable error correction circuit 48 is to compensate for the distortion in the feedback signal rx(n). On an initial pass, the estimated distortion provided by the adjustable error correction circuit 48 may be zero or a preset amount.

The adder circuit 46 combines the delayed input signal with the estimated distortion from the adjustable error correction circuit 48. This combined signal is provided to a gain adjusting circuit 50. The gain adjusting circuit 50 prevents clipping of the combined signal. If the delayed input signal with the estimated distortion has too much gain, then the gain is reduced.

The "clipped" delayed input signal with the estimated distortion is provided to a difference circuit 52. Also provided to the difference circuit 52 is the feedback signal rx(n). The output from the difference circuit 52 is a difference signal between the delayed input signal with the estimated distortion, and the feedback signal rx(n) that includes the actual distortion at the antenna 18.

The difference signal is applied to an error calculation circuit 54. The error correction circuit 54 generates an error signal err(n) that is provided to the adjustable error correction circuit 48. The adjustable error correction circuit 54 contains logic to compute averaged minimum and maximum errors. The error signal err(n) is a complex number, for example.

Based on the sign of the complex number, the error correction circuit 48 either increases or decreases the estimated distortion being applied to the delayed input signal while rotating it in the right direction to force the error towards zero. The goal is to iteratively adjust the estimated distortion until the error signal err(n) is zero in mean or least square sense or is close to zero. The error correction circuit 48 adjusts the estimated distortion using a steepest descent algorithm, such as a least means square (LMS) algorithm, for example. Under normal operation, the estimated distortion may be estimated off-line. The delayed input signal with the estimated distortion and the feedback signal rx(n) are compared frequently, such as in the millisecond range, for example.

The estimated distortion as determined by the error correction circuit 48 is applied to the processor 60. The processor 60 then generates an adjustment signal adj(n) to adjust the impedance of the adjustable impedance matching network 14. The adjustable impedance matching network 14 may include a DC-DC converter, a digital-to-analog converter and a tuning device, for example. The tuning device may be a varactor (i.e., a variable capacitor), for example, that can be programmed.

A value of the varactor can be change by changing a voltage applied thereto. The adjustable impedance matching network 14 may include an SPI port, and the voltage is changed by writing a digital code to the SPI port. The digital code received at the SPI port is converted from digital to analog. At an analog value, the proper voltage is applied to the varactor. As long as the error signal err(n) approaches zero, the estimated distortion is reduced or removed by the adjustable impedance matching network 14.

The processor 60 also uses the err(n) signal to accommodate temperature based delay changes between the input signal tx(n) and the feedback signal rx(n). As noted above, the analog transmit section 72 within the transmitter 12 and the analog receive section 82 within the feedback receiver 20 are effected by temperature variations.

A mathematical description of one implementation follows. The error signal $e(n)=d(n)-y(n)$, where the received signal $y(n)=tx(n)(1+w1(n))$ is the distorted signal obtained from the ideal signal tx(n). The received signal is the desired response d(n) which has seen the real distortion from the antenna impedance mismatch. The gradient of error signal with respect to w1 is $-tx^*(n)$, where subscript * denotes a complex conjugation. The update equation is therefore $w1(n+1)=w1(n)+mu\ e(n)tx^*(n)$. The variable w1 will finally converge to the value of the antenna mismatch as the error becomes zero in a statistical sense. Several other implementations are possible with the same basic concept.

Another advantage of using a processor 60 is that software changes can be made to accommodate design and performance changes that may be necessary during operation of the controller 22. Without the processor 60, performance changes would have to be implemented via hardware. Hardware changes can be costly and time consuming as compared to software changes.

The transmitter 12 includes a digital transmit section 70, an analog transmit section 72 coupled to the digital transmit section, and a power amplifier 76 coupled to the analog transmit section. The digital transmit section 70 performs sampling rate conversion and pre-compensates for the analog imperfections that are encountered in the analog transmit section 72. In the analog transmit section 72, the pre-compensated signals are converted from digital to analog, up-converted in frequency and pre-amplified prior to the power amplifier 76.

The non-directional coupler 16 captures a portion of the electro-magnetic energy for down-conversion and analog-to-digital conversion in the feedback receiver 20. The feedback receiver 20 includes a low noise power amplifier 86, an analog receive section 82 coupled to the low noise power amplifier, and a digital receive section 80 coupled to the analog receive section. The power amplifier 86 is used for gain, and to also isolate the antenna 18 from the local oscillator used in the down-conversion within the analog receive section 82. The digital receive section 80 compensates for analog imperfections, such as DC offset and IQ mismatch.

Still referring to FIG. 4, the feedback receiver 20 has its own phase locked loop (PLL) 84, and the transmitter 12 has its own phase locked loop PLL 74. Any impairment created in the feedback receiver 20 is at a frequency offset from the impairment to be measured. The frequency offset is at an IF frequency instead of a 0 frequency, and this allows separation using the IF frequency. The frequency offset is removed in the digital receive section 80, wherein a filter is used to remove the impairment that was caused in the feedback receiver 12. As a result, the communications device 10 is limited to the impairment that was created in the transmitter 12 so that the mismatch at the antenna 18 can be more accurately estimated using separate PLLs 74, 84.

Alternatively, one PLL can drive both the transmitter 12 as well as the feedback receiver 20. A disadvantage of a shared PLL is that any impairment in the signal at the antenna mismatch (as provided by the transmitter 12) would be passed to the analog/digital converter in the feedback receiver 20. It is difficult to distinguish between the impairment created by the feedback receiver 20 and from what is being measured. To compensate for this disadvantage, the feedback receiver 20 is calibrated so that it is not creating any noticeable addition to the impairment that is being measured.

Figure 5:
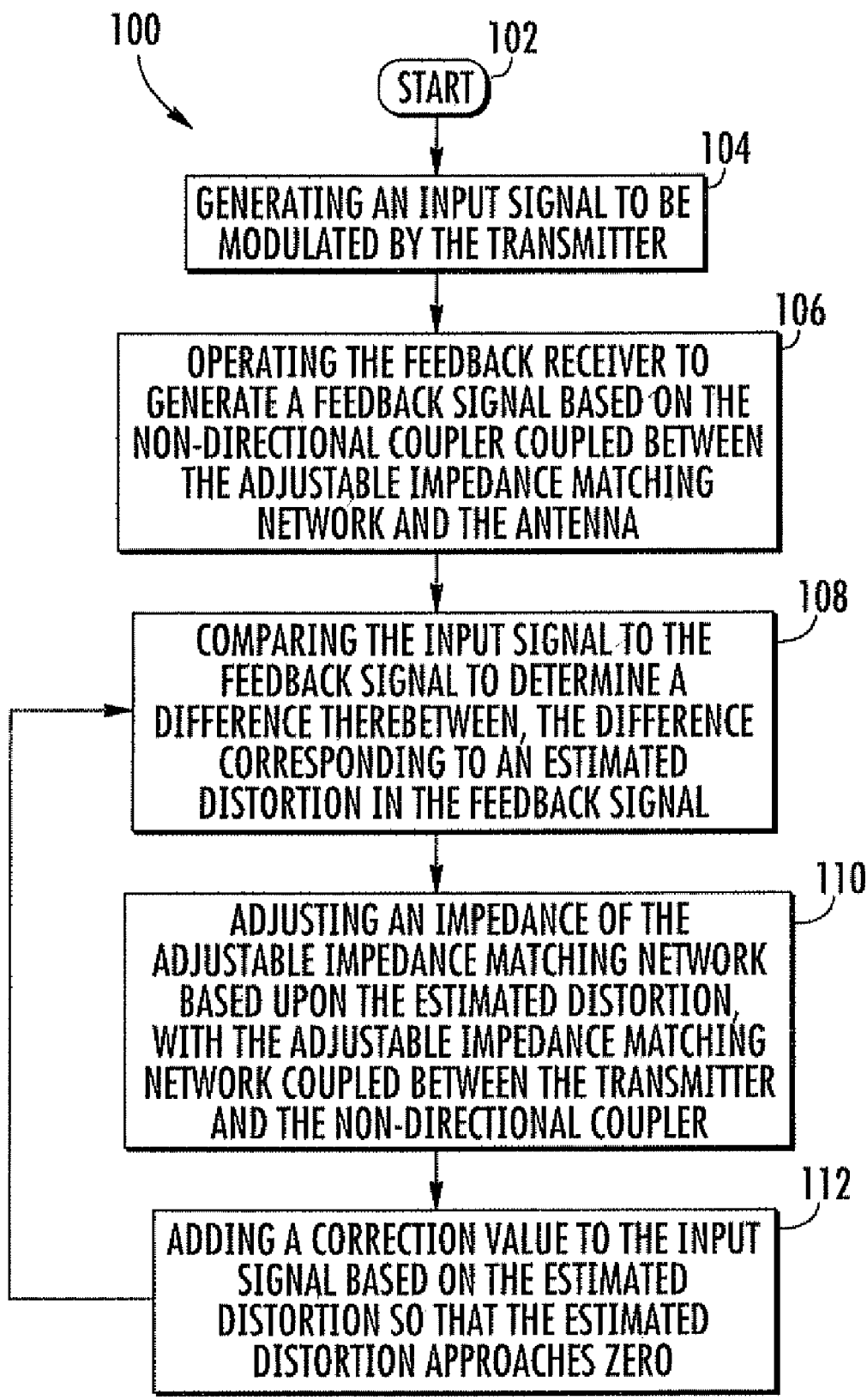
FIG. 5 is a flowchart illustrating a method for operating a mobile wireless communications device in accordance with one exemplary aspect.

A flowchart 100 illustrating a method for operating a mobile wireless communications device 10 will now be discussed in reference to FIG. 5. From the start (Block 102), the method comprises generating an input signal tx(n) to be modulated by the transmitter 12 at Block 104. The feedback receiver is operated at Block 106 to generate a feedback signal rx(n) based on the non-directional coupler 16 coupled between the adjustable impedance matching network 14 and the antenna 18.

The input signal tx(n) is compared to the feedback signal rx(n) at Block 108 to determine a difference therebetween. The difference corresponds to an estimated distortion in the feedback signal rx(n). An impedance of the adjustable impedance matching network 14 is adjusted at Block 110 based upon the estimated distortion. The adjustable impedance matching network 14 is coupled between the transmitter 12 and the non-directional coupler 16. A correction value is added to the input signal tx(n) based on the estimated distortion so that the estimated distortion approaches zero at Block 112. Since the goal is to iteratively adjust the estimated distortion until the error signal is zero or is close to zero, the output of Block 112 loops back to Block 108 to repeat the process.

Figure 6:
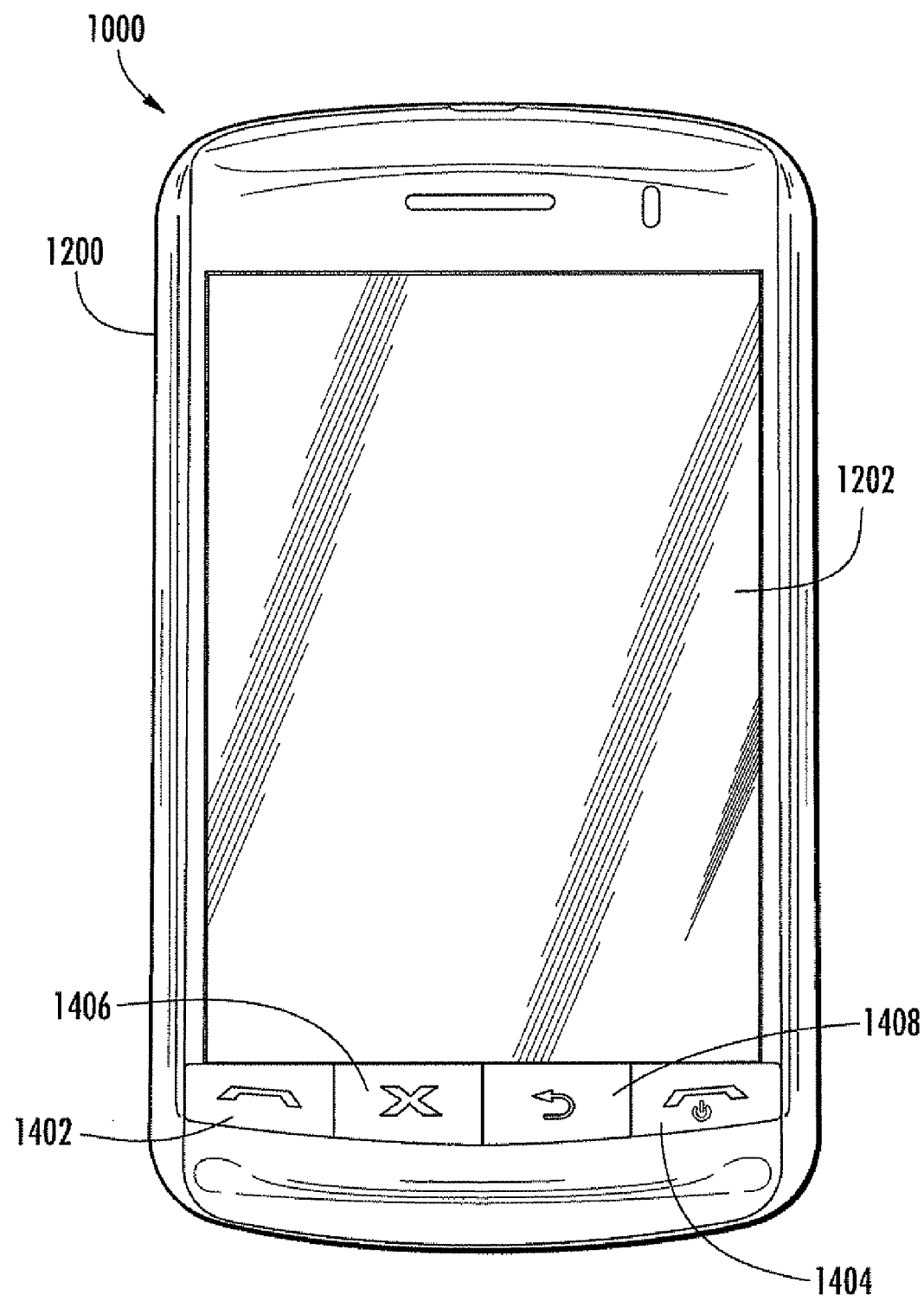
FIG. 6 is a front view of a mobile wireless communications device in accordance with another exemplary aspect.

Exemplary components that may be used in various embodiments of the above-described mobile wireless communications device are now described with reference to an exemplary mobile wireless communications device 1000 shown in FIGS. 6 and 7.

The mobile wireless communications device 1000 illustratively includes a portable housing 1200, a keypad 1400 and an output device 1600. The output device shown is a display 1600, which may comprise a full graphic LCD. In some embodiments, display 1600 may comprise a touch-sensitive input and output device. Other types of output devices may alternatively be utilized. The keypad 1400 includes a plurality of control keys including an "off hook" (i.e., initiate phone call) key 1402, an "on hook" (i.e., discontinue phone call) key 1404, a menu key 1406, and a return or escape key 1408.

A processing device 1800 is contained within the housing 1200 and is coupled between the keypad 1400 and the display 1600. The processing device 1800 controls the operation of the display 1600, as well as the overall operation of the mobile device 1000, in response to actuation of keys on the keypad 1400 by the user. In some embodiments, keypad 1400 may comprise a physical keypad or a virtual keypad (e.g., using a touch-sensitive interface) or both.

The housing 1200 may be elongated vertically, or may take on other sizes and shapes (including clamshell housing structures, for example). The keypad 1400 may include a mode selection key, or other hardware or software for switching between text entry and telephony entry.

Figure 7:
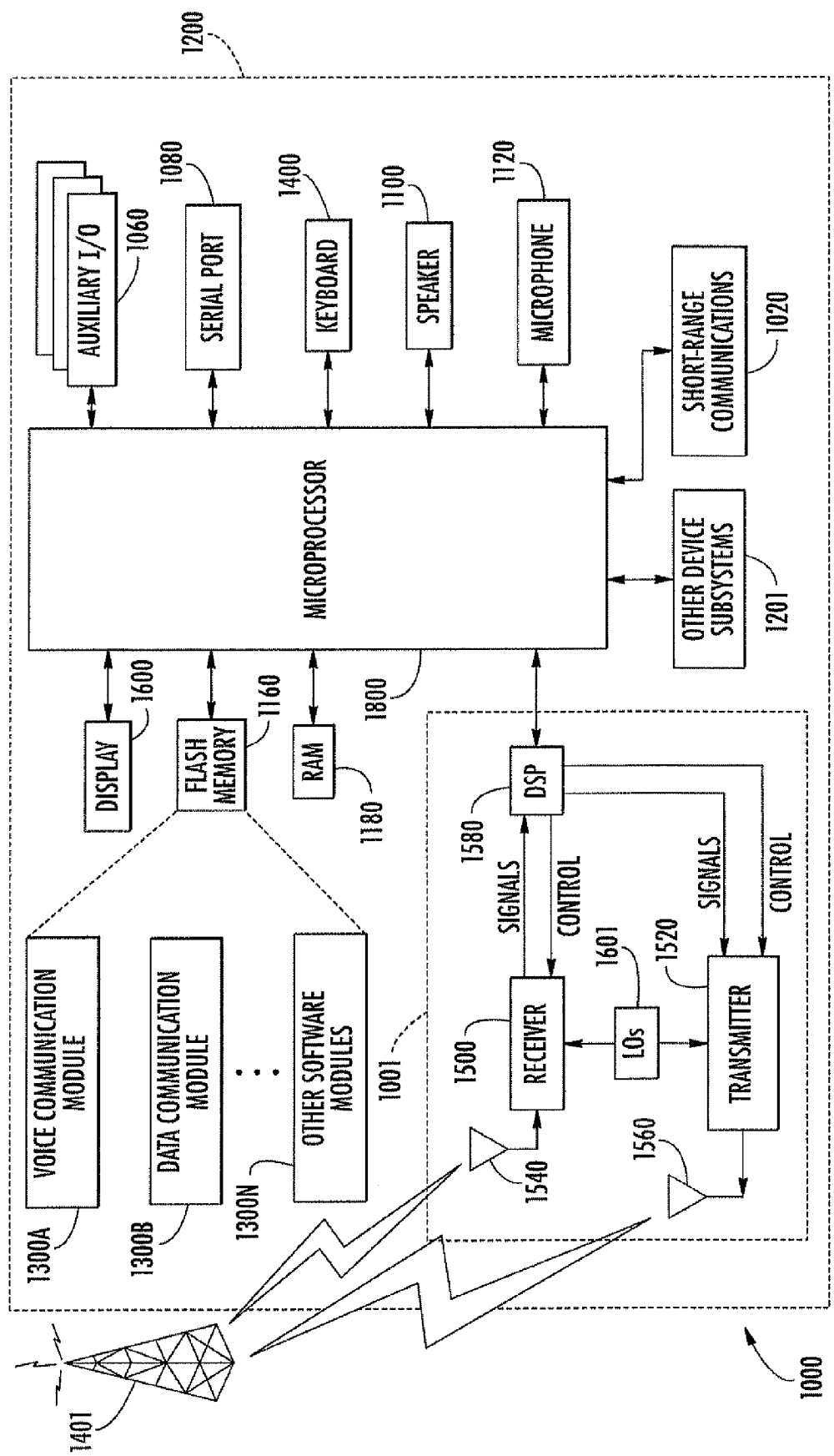
FIG. 7 is a schematic block diagram illustrating additional components that may be included in the mobile wireless communications device illustrated in FIG. 6.

In addition to the processing device 1800, other parts of the mobile device 1000 are shown schematically in FIG. 7. These include a communications subsystem 1001; a short-range communications subsystem 1020; the keypad 1400 and the display 1600, along with other input/output devices 1060, 1080, 1100 and 1120; as well as memory devices 1160, 1180 and various other device subsystems 1201. The mobile device 1000 may comprise a two-way RF communications device having voice and data communications capabilities. In addition, the mobile device 1000 may have the capability to communicate with other computer systems via the Internet.

Operating system software executed by the processing device 1800 may be stored in a persistent store, such as the flash memory 1160, but may be stored in other types of memory devices, such as a read only memory (ROM) or similar storage element. In addition, system software, specific device applications, or parts thereof, may be temporarily loaded into a volatile store, such as the random access memory (RAM) 1180. Communications signals received by the mobile device may also be stored in the RAM 1180.

The processing device 1800, in addition to its operating system functions, enables execution of software applications or modules 1300A-1300N on the device 1000, such as software modules for performing various steps or operations. A predetermined set of applications that control basic device operations, such as data and voice communications 1300A and 1300B, may be installed on the device 1000 during manufacture. In addition, a personal information manager (PIM) application may be installed during manufacture. The PIM may be capable of organizing and managing data items, such as e-mail, calendar events, voice mails, appointments, and task items. The PIM application may also be capable of sending and receiving data items via a wireless network 1401. The PIM data items may be seamlessly integrated, synchronized and updated via the wireless network 1401 with the device user's corresponding data items stored or associated with a host computer system.

Communication functions, including data and voice communications, are performed through the communications subsystem 1001, and possibly through the short-range communications subsystem. The communications subsystem 1001 includes a receiver 1500, a transmitter 1520, and one or more antennas 1540 and 1560. In addition, the communications subsystem 1001 also includes a processing module, such as a digital signal processor (DSP) 1580, and local oscillators (LOs) 1601. The specific design and implementation of the communications subsystem 1001 is dependent upon the communications network in which the mobile device 1000 is intended to operate. For example, a mobile device 1000 may include a communications subsystem 1001 designed to operate with the Mobitex™, Data TAC™ or General Packet Radio Service (GPRS) mobile data communications networks, and also designed to operate with any of a variety of voice communications networks, such as AMPS, TDMA, CDMA, WCDMA, PCS, GSM, EDGE, etc. Other types of data and voice networks, both separate and integrated, may also be utilized with the mobile device 1000. The mobile device 1000 may also be compliant with other communications standards such as GSM, 3G, UMTS, 4G, etc.

Network access requirements vary depending upon the type of communication system. For example, in the Mobitex and DataTAC networks, mobile devices are registered on the network using a unique personal identification number or PIN associated with each device. In GPRS networks, however, network access is associated with a subscriber or user of a device. A GPRS device therefore utilizes a subscriber identity module, commonly referred to as a SIM card, in order to operate on a GPRS network.

When required network registration or activation procedures have been completed, the mobile device 1000 may send and receive communications signals over the communication network 1401. Signals received from the communications network 1401 by the antenna 1540 are routed to the receiver 1500, which provides for signal amplification, frequency down conversion, filtering, channel selection, etc., and may also provide analog to digital conversion. Analog-to-digital conversion of the received signal allows the DSP 1580 to perform more complex communications functions, such as demodulation and decoding. In a similar manner, signals to be transmitted to the network 1401 are processed (e.g. modulated and encoded) by the DSP 1580 and are then provided to the transmitter 1520 for digital to analog conversion, frequency up conversion, filtering, amplification and transmission to the communication network 1401 (or networks) via the antenna 1560.

In addition to processing communications signals, the DSP 1580 provides for control of the receiver 1500 and the transmitter 1520. For example, gains applied to communications signals in the receiver 1500 and transmitter 1520 may be adaptively controlled through automatic gain control algorithms implemented in the DSP 1580.

In a data communications mode, a received signal, such as a text message or web page download, is processed by the communications subsystem 1001 and is input to the processing device 1800. The received signal is then further processed by the processing device 1800 for an output to the display 1600, or alternatively to some other auxiliary I/o device 1060. A device user may also compose data items, such as e-mail messages, using the keypad 1400 and/or some other auxiliary I/O device 1060, such as a touchpad, a rocker switch, a thumb-wheel, or some other type of input device. The composed data items may then be transmitted over the communications network 1401 via the communications subsystem 1001.

In a voice communications mode, overall operation of the device is substantially similar to the data communications mode, except that received signals are output to a speaker 1100, and signals for transmission are generated by a microphone 1120. Alternative voice or audio I/O subsystems, such as a voice message recording subsystem, may also be implemented on the device 1000. In addition, the display 1600 may also be utilized in voice communications mode, for example to display the identity of a calling party, the duration of a voice call, or other voice call related information.

The short-range communications subsystem enables communication between the mobile device 1000 and other proximate systems or devices, which need not necessarily be similar devices. For example, the short-range communications subsystem may include an infrared device and associated circuits and components, or a Bluetooth™ communications module to provide for communication with similarly-enabled systems and devices.

Many modifications and other embodiments of the disclosure will come to the mind of one skilled in the art having the benefit of the teachings presented in the foregoing descriptions and the associated drawings. Therefore, it is understood that the disclosure is not to be limited to the specific embodiments disclosed, and that modifications and embodiments are intended to be included as readily appreciated by those skilled in the art.

That which is claimed:

1. A mobile wireless communications device comprising:
   a portable housing;
   a transmitter carried by said portable housing and configured to modulate an input signal;
   an adjustable impedance matching network carried by said portable housing and coupled downstream from said transmitter;
   an antenna carried by said portable housing and coupled downstream from said adjustable impedance matching network;
   a non-directional coupler carried by said portable housing and coupled between said adjustable impedance matching network and said antenna;
   a feedback receiver carried by said portable housing and coupled to said non-directional coupler to generate a feedback signal; and
   a controller carried by said portable housing and configured to control said adjustable impedance matching network based upon the input signal and the feedback signal.

2. The wireless communications device according to claim 1 wherein said non-directional coupler comprises a signal path conductor and a feedback path conductor inductively coupled thereto.

3. The wireless communications device according to claim 1 wherein said non-directional coupler comprises a signal path conductor and a resistive load coupled thereto.

4. The wireless communications device according to claim 1 wherein said controller is configured to compare the input signal to the feedback signal in at least one iteration to determine at least one difference therebetween, and adjust an impedance of said adjustable impedance matching based upon the at least one difference.

5. The wireless communications device according to claim 4 wherein the at least one iteration comprises a plurality of iterations; and wherein said controller is further configured to add a correction value to the input signal in each iteration.

6. The wireless communications device according to claim 5 wherein said controller is configured to calculate correction values based on a least means square (LMS) algorithm.

7. The wireless communications device according to claim 4 wherein said controller comprises a delay circuit configured to delay the input signal so that the input signal and the feedback signal match up in time when compared.

8. The wireless communications device according to claim 7 wherein said delay circuit is configured to implement a fixed delay corresponding to inherent delays of said transmitter and said feedback receiver, and a variable delay corresponding to variable environmental conditions.

9. The wireless communications device according to claim 1 wherein said adjustable impedance matching network comprises at least one variable capacitor.

10. The wireless communications device according to claim 1 further comprising a signal receiver carried by said portable housing and coupled to said antenna.

11. The wireless communications device according to claim 1 wherein said transmitter comprises a multi-frequency band transmitter.

12. A mobile wireless communications device comprising:
    a portable housing;
    a transceiver carried by said portable housing and configured to operate over a plurality of spaced-apart frequency bands, and comprising a transmitter configured to modulate an input signal within a selected frequency band, and a signal receiver;
    an adjustable impedance matching network carried by said portable housing and coupled downstream from said transmitter;
    an antenna carried by said portable housing and coupled to said signal receiver, and coupled downstream from said adjustable impedance matching network;
    a non-directional coupler carried by said portable housing and coupled between said adjustable impedance matching network and said antenna;

a feedback receiver carried by said portable housing and coupled to said non-directional coupler to generate a feedback signal; and a controller carried by said portable housing and configured to compare the input signal to the feedback signal in at least one iteration to determine at least one difference therebetween, and adjust an impedance of said adjustable impedance matching based upon the at least one difference.

13. The wireless communications device according to claim 12 wherein said non-directional coupler comprises a signal path conductor and a feedback path conductor inductively coupled thereto.

14. The wireless communications device according to claim 12 wherein said non-directional coupler comprises a signal path conductor and a resistive load coupled thereto.

15. The wireless communications device according to claim 12 wherein the at least one iteration comprises a plurality of iterations; and wherein said controller is further configured to add a correction value to the input signal in each iteration.

16. The wireless communications device according to claim 12 wherein said adjustable impedance matching network comprises at least one variable capacitor.

17. The wireless communications device according to claim 12 wherein said transmitter comprises a multi-frequency band transmitter.

18. A method for operating a mobile wireless communications device comprising a transmitter, an adjustable impedance matching network coupled downstream from the transmitter, an antenna coupled downstream from the adjustable impedance matching network, a non-directional coupler coupled between the adjustable impedance matching network and the antenna, and a feedback receiver coupled to the non-directional coupler, the method comprising:

generating an input signal to be modulated by the transmitter;

operating the feedback receiver to generate a feedback signal from the non-directional coupler; and adjusting the adjustable impedance matching network based upon the input signal and the feedback signal.

19. The method according to claim 18 wherein the non-directional coupler comprises a signal path conductor and a feedback path conductor inductively coupled thereto.

20. The method according to claim 18 wherein the non-directional coupler comprises a signal path conductor and a resistive load coupled thereto.

21. The method according to claim 18 further comprising comparing the input signal to the feedback signal in at least one iteration to determine at least one difference therebetween; and wherein the adjusting comprises adjusting an impedance of the adjustable impedance matching based upon the at least one difference.

22. The method according to claim 21 wherein the at least one iteration comprises a plurality of iterations; and further comprising adding a correction value to the input signal in each iteration.

23. The method according to claim 22 wherein the correction values are calculated based on a least means square (LMS) algorithm.

24. The method according to claim 21 further comprising delaying the input signal so that the input signal and the feedback signal match up in time when compared.

25. The method according to claim 24 wherein the delaying comprises a fixed delay corresponding to inherent delays of the transmitter and the feedback receiver, and a variable delay corresponding to variable environmental conditions.

26. The method according to claim 18 wherein the adjustable impedance matching network comprises at least one variable capacitor.

27. The method according to claim 18 wherein the mobile wireless communications device comprises a signal receiver coupled to the antenna.

28. The method according to claim 18 wherein the transmitter comprises a multi-frequency band transmitter.

* * * * *